United States Patent [19]

Inada et al.

[11] Patent Number: 5,306,172
[45] Date of Patent: Apr. 26, 1994

[54] VIDEO TAPE RECORDER HAVING BUILT-IN CAMERA DETACHABLE HAND GRIP MEMBER

[75] Inventors: Shinsaku Inada; Eiji Ohshima, both of Tokyo; Hideaki Io, Kanagawa; Masayoshi Morikawa, Tokyo, all of Japan

[73] Assignee: Sony Corporation, Tokyo, Japan

[21] Appl. No.: 985,350

[22] Filed: Dec. 1, 1992

Related U.S. Application Data

[60] Continuation of Ser. No. 823,130, Jan. 21, 1992, abandoned, which is a division of Ser. No. 751,650, Aug. 26, 1991, Pat. No. 5,157,512.

[30] Foreign Application Priority Data

| May 27, 1985 | [JP] | Japan | 60-78896[U] |
| May 27, 1985 | [JP] | Japan | 60-78897[U] |
| May 27, 1985 | [JP] | Japan | 60-78898[U] |
| May 27, 1985 | [JP] | Japan | 60-78899[U] |

[51] Int. Cl.⁵ .............................................. H01R 13/00
[52] U.S. Cl. ................................... 439/299; 439/500
[58] Field of Search ............... 439/296, 299, 310, 342, 439/343, 345, 366, 500, 529, 530, 533

[56] References Cited

U.S. PATENT DOCUMENTS

| 3,617,985 | 11/1971 | Kehl | 439/533 |
| 4,218,107 | 8/1980 | Wilson | 439/342 |
| 4,550,968 | 11/1985 | Corrigan | 439/345 |
| 4,822,296 | 4/1989 | Wilson | 439/343 |

Primary Examiner—Joseph H. McGlynn
Attorney, Agent, or Firm—Hill, Steadman & Simpson

[57] ABSTRACT

A combination video tape recorder and camera includes a main body having a video tape recorder and a television camera, and a separable hand grip secureable to a side wall of the main body. The hand grip carries a view finder for the camera and a battery for supplying operational power to the video tape recorder and the television camera.

56 Claims, 7 Drawing Sheets

VIDEO TAPE RECORDER HAVING BUILT-IN CAMERA DETACHABLE HAND GRIP MEMBER

This is a continuation of application Ser. No. 823,130, filed Jan. 21, 1992, abandoned, which is a division of Ser. No. 751,650, filed Aug. 26, 1991, now U.S. Pat. No. 5,157,512.

BACKGROUND OF THE INVENTION

1. Field of the Invention

The present invention relates generally to a video tape recorder with a camera and more particularly is directed to a video tape recorder having a built-in camera.

2. Description of the Prior Art

In a typical home video tape recorder having built-in video camera, the user generally holds a hand grip portion of this built-in camera type video tape recorder with his right hand while operating the camera to take video images.

In the prior art video tape recorder having a built-in camera, the hand grip portion is provided on a side wall of the video tape recorder. This causes the over-all thickness of the video tape recorder to be relatively large. As a result, when the user carries this video tape recorder having a built-in camera in its non-operational mode, this video tape recorder can not be put into a carrying case such as an attache' case or the like that is relatively thin. Instead, the user has to carry such a video tape recorder in a larger, special case, which is generally unwieldy and often identifiable by others as a camera case.

In the conventional built-in camera type video tape recorder, a television camera section, a video tape recorder section and a view finder section are substantially formed in a combination form as a single unit. Therefore, the operational modes or status of the television camera section and the video tape recorder section can easily be displayed in an optical or electronic tyupe view finder.

When a built-in camera type video tape recorder is designed to be small in size and hence easily portable, the television camera section and the video tape recorder section are preferably formed into a combination form as a main body and a hand grip is formed to include therein an optical type view finder and a battery. When both the main body and the hand grip section are coupled together to take a video picture, the problem arises that the operational status of the television camera section and the video tape recorder section cannot be optically displayed within the optical type view finder.

Of course, if a number of electrical contacts are provided on the main body and the hand grip section so as to be contacted with one another when both of the main body and the hand grip are coupled using light emission elements such as an LEDs (light emmission diode) located within the optical view finder. Together it becomes possible to display the operational status of the television camera section and the video tape recorder section. However, in this case, further problem occurs, that the electrical contacts will easily malfunction, thus lacking the reliance of this built-in camera type video tape recorder.

OBJECTS AND SUMMARY OF THE INVENTION

Accordingly, it is a general object of this invention to provide a video tape recorder having a built-in camera.

An object of this invention is to provide a video tape recorder having a built-in camera in which a main body section and a hand grip section are easily detachable from each other so that upon carrying, the overall thickness of the built-in camera type video tape recorder can be reduced and thereby the built-in camera type video tape recorder can be easily kept in a thin case or the like and made suitable for portable use.

Another object of this invention is to provide a video tape recorder having a built-in camera in which a view finder and a battery are incorporated in a hand grip section and the main body section and the hand grip section are separable at their side walls.

Further object of this invention is to provide a video tape recorder having a built-in camera in which the status of the various operational elements in the main body section can be optically displayed by an optical type status indication section provided at the face, in the view finder area, and in which a hand grip section is detachable from a main body section.

A still further object of this invention is to provide a video tape recorder having a built-in camera, in which a light guide section is mounted on a face in which a hand grip section is detachable from a main body section, whereby the optical display of an optical type status indication section is carried out within a view finder incorporated in the hand grip section.

According to one aspect of the present invention, there is provided a video tape recorder having a built-in camera comprising:

a) a main body having a video tape recorder and a television camera; and b) a hand grip separably mounted on a side wall of said main body, said hand grip carrying a view finder and a battery for supplying a view finder and a battery for supplying operational power to said video tape recorder and said television camera.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of a video tape recorder having a built-in camera according to the present invention will hereinafter be described with reference to the attached drawings.

Figure 1:
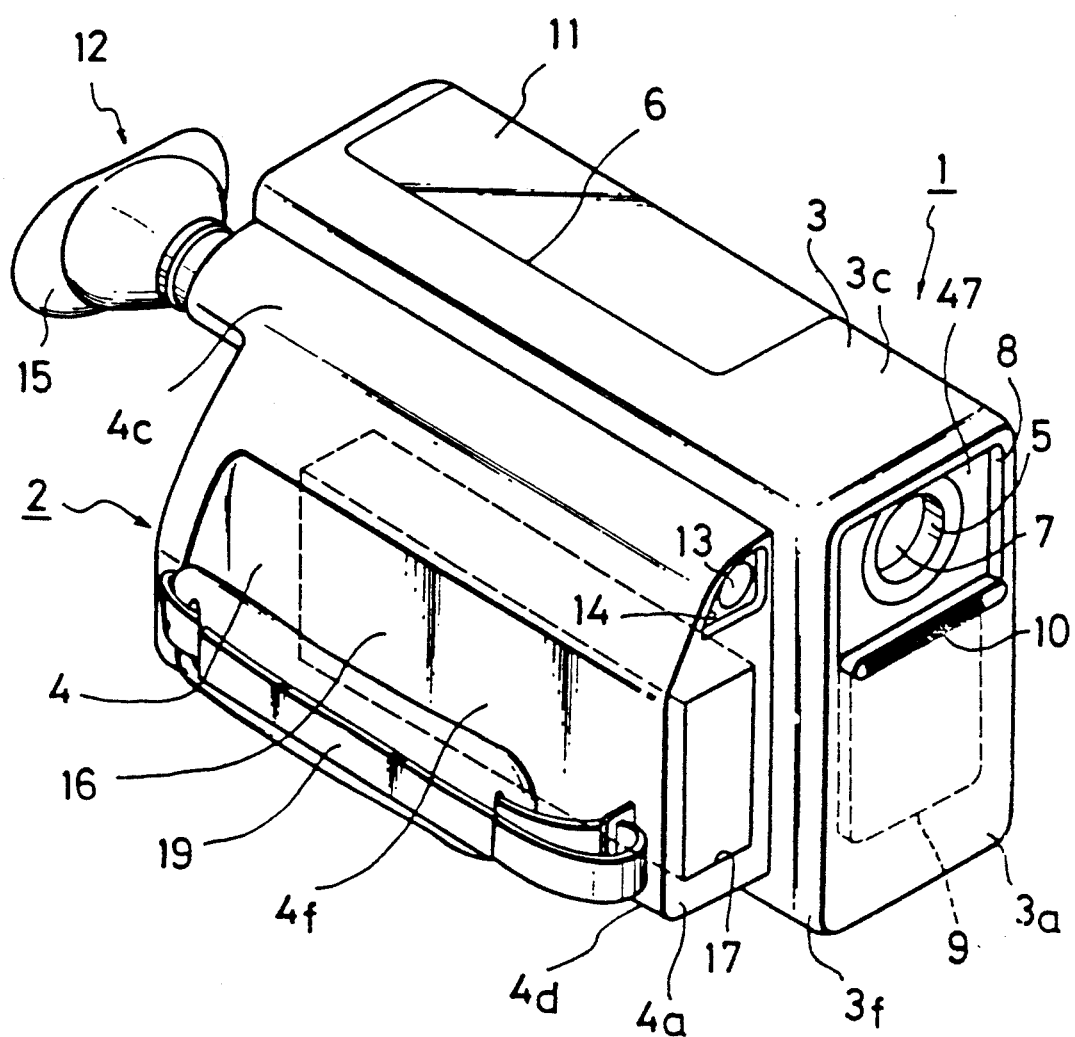
FIG. 1 is a perspective view of an embodiment of a video tape recorder having a built-in camera according to the present invention, seen from its right-front direction.
Figure 2:
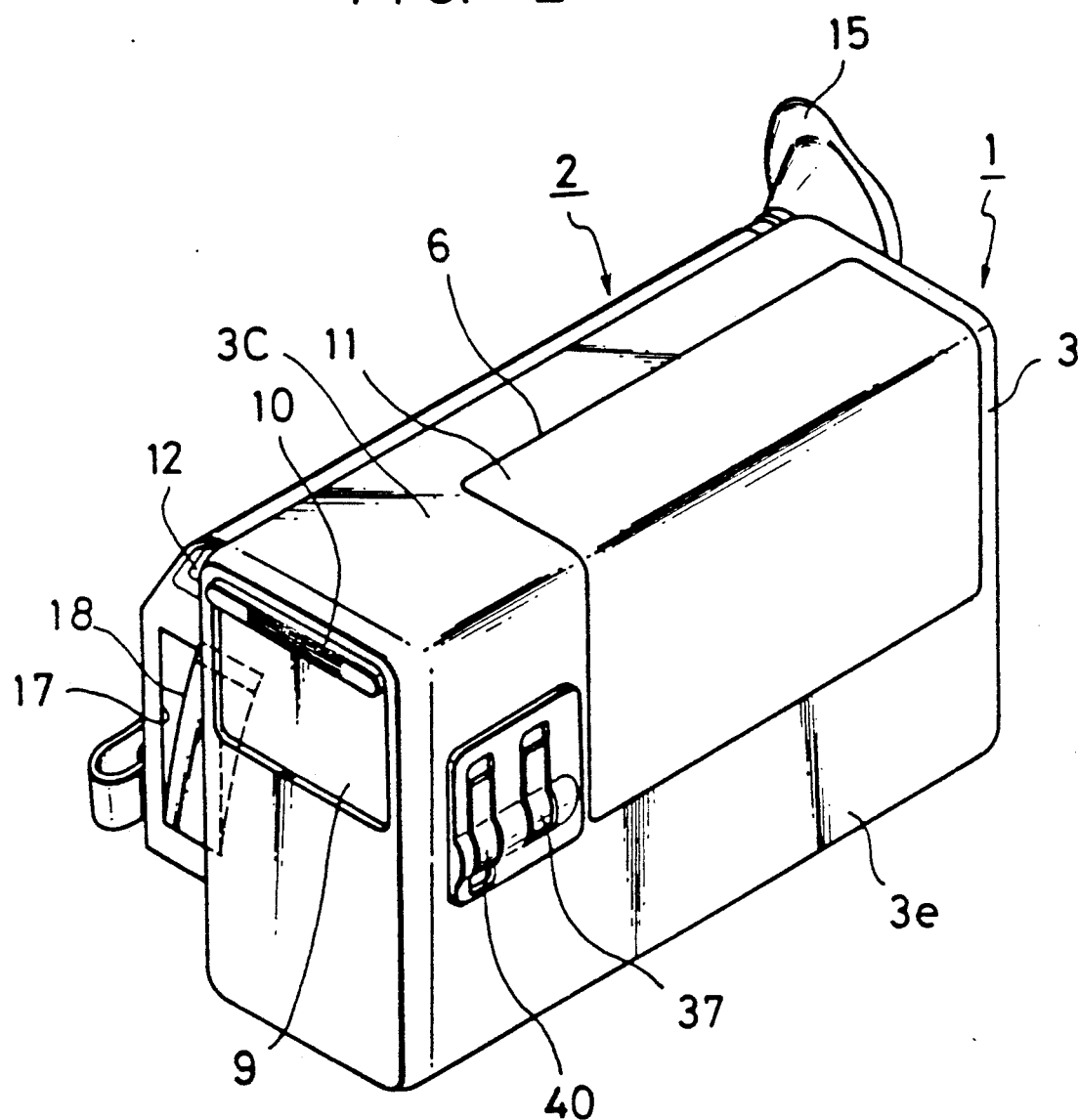
FIG. 2 is a like perspective view of the embodiment of the video tape recorder having a built-in camera according to the present invention, seen from the left-front direction.
Figure 3:
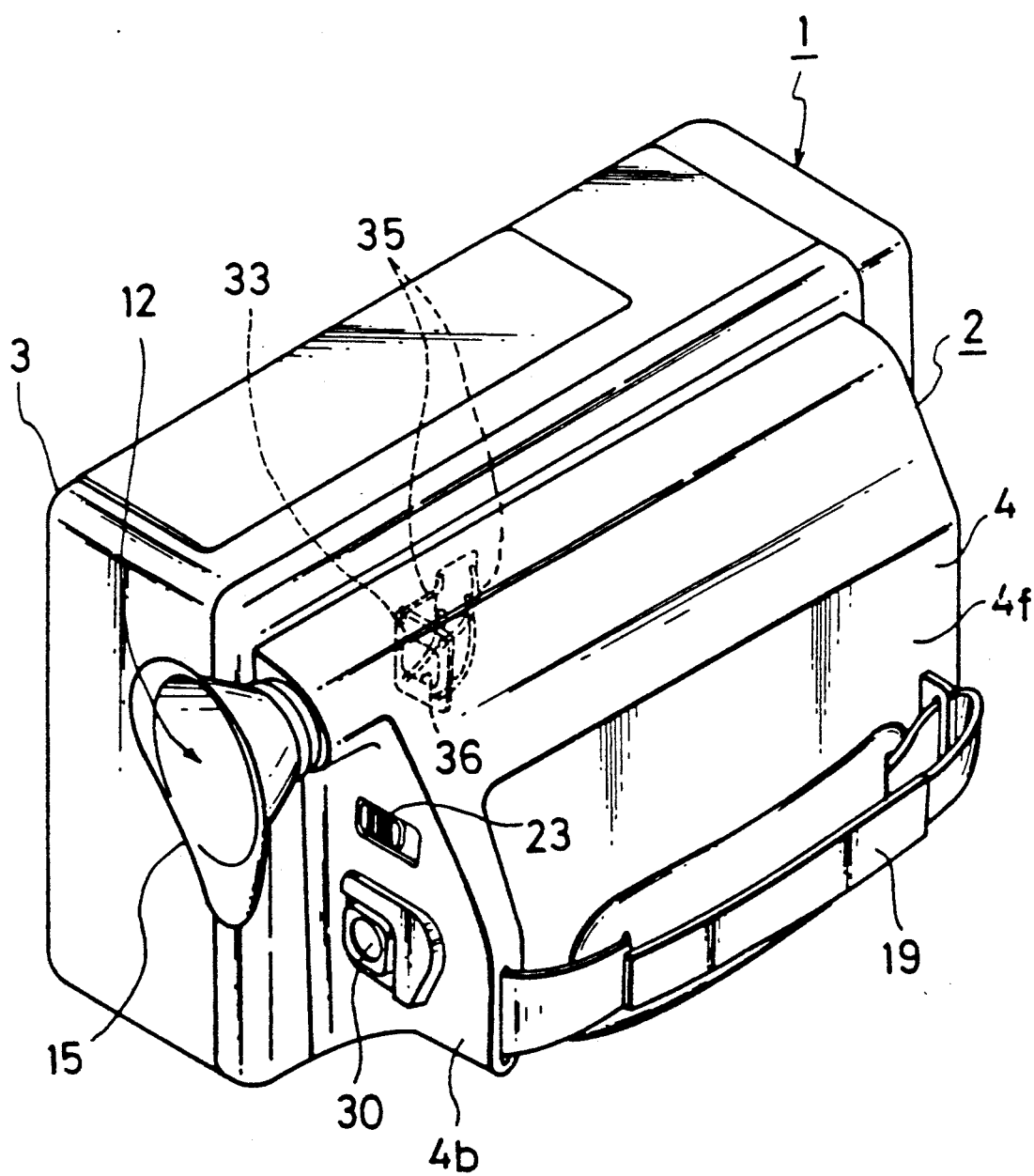
FIG. 3 is a perspective view of the embodiment of the video tape recorder having a built-in camera according to the present invention, seen from its right-rear direction.

Referring to FIG. 1 through FIG. 3, the video tape recorder having a built-in camera according to this embodiment is formed of a main body 1 and a hand grip 2 which are separable. Casings or housings 3 and 4 of the main body 1 and the hand grip 2 are all made of synthetic resin. The main body housing 3 is formed substantially as a rectangular solid shape and also the hand grip housing 4 is formed substantially as a rectangular solid shape. In this case, however, the hand grip housing 4 is curved from its upper wall 4c through its right side wall 4f to its lower wall 4d so as to fit the palm of the right hand of a user.

A television (TV) camera section 5 and a video tape recorder (VTR) section 6 are incorporated in the main body housing 3, respectively. Further, a lens window frame 47 is fixed to a lens window opening 8 of a rectangular shape formed through the upper portion of a front wall 3a of the main body housing 3. An objective lens 7 of the TV camera section 5 faces to the outside through the window frame 47 attached to the lens window opening 8. A dust-proof cover 9 is attached to the rear side of the front wall 3a through appropriate attaching means so as to be slidable in the vertical direction between the front wall 3a and this window frame 47. The upper end edge of this dust-proof cover 9 protrudes slightly beyond the window opening 8 of the front wall 3a and thereby forms a knob 10 of the dust-proof cover 9. The cover 9 can be maintained in a ratchet detent fashion so that it will be held in an open state as shown in FIG. 1 or in the closed state as shown in FIG. 2.

A lid 11 having the same configuration and shape as a part of the main body housing 3 is attached to the main body housing 3 from its upper wall 3c to its left side wall 3e. The lid 11 is made freely rotatable relative to the main body housing 3 with its lower edge as a hinge. When the lid 11 is set in the opened state, a video tape cassette (not shown) is detachably loaded on a cassette compartment portion (not shown) of the VTR section 6.

In the hand grip section 2, an optical type view finder 12 is incorporated in the upper portion of the hand grip housing 4. An objective lens 13 of the optical view finder 12 faces forwardly through a window opening 14 that is formed through the upper portion of the front wall 4a. To the upper end of a rear wall 4b of the hand grip housing 4, there is attached a so-called eye cup 15 made of resilient material. In this case, this optical type view finder 12 is completely independent of the optical system of the objective lens 7 of the television camera section 5.

A rechargeable battery 16 is incorporated within the hand grip housing 4 so as to be freely replaceable. An opening 17 is formed through the front wall 4a of the hand grip housing 4 to permit replacement of rechargeable battery 16. When the rechargeable battery is taken out through the opening 37, the opening 17 may be closed by a lid 18 (see FIG. 2). When the rechargeable battery 16 is inserted into the hand grip housing 4 through the opening 17, the lid 18 is opened with the tip end of the rechargeable battery 16 and pushed back inside. When the rechargeable battery 16 is taken out of the hand grip housing 4, the lid 18 automatically closes the opening 17. FIG. 2 illustrates the lid 18 in the midst of its rising and falling movement. Further, a strap 19 is attached to the hand grip housing 4 in opposing relation to the right side wall 4f. The user can hold the hand grip housing 4 with his right hand, which in turn is held between the strap 19 and the hand grip housing 4.

The right side wall 3f of the main body housing 3 and the left side wall 4e of the hand grip housing 4 are formed as coupled side walls which are secured to each other. On these walls 3f and 4e there are provided coupling means, respectively. This will be described with reference to FIGS. 4 and 5.

Figure 4:
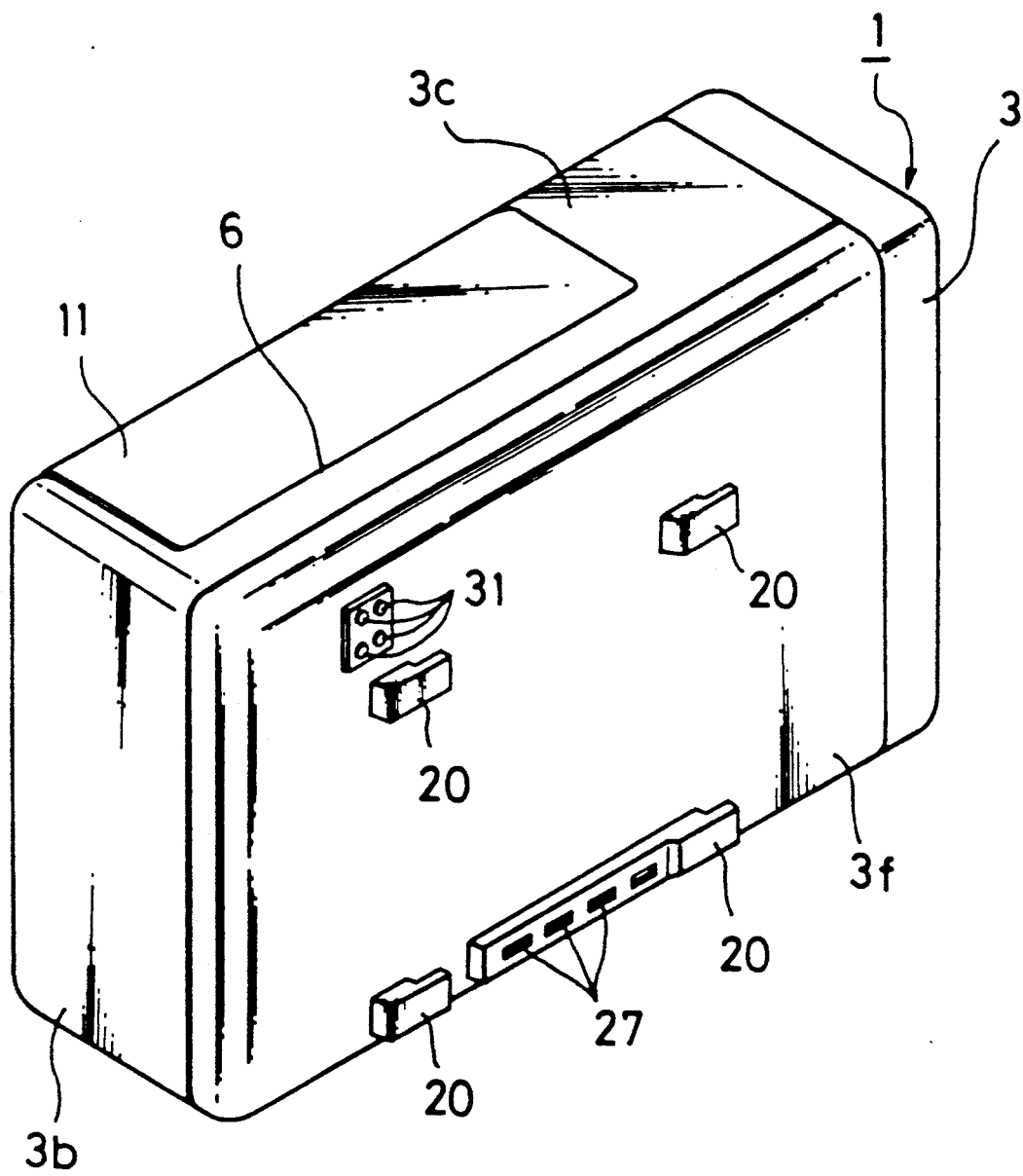
FIG. 4 is a perspective view of its main body seen from its right-rear direction.
Figure 5:
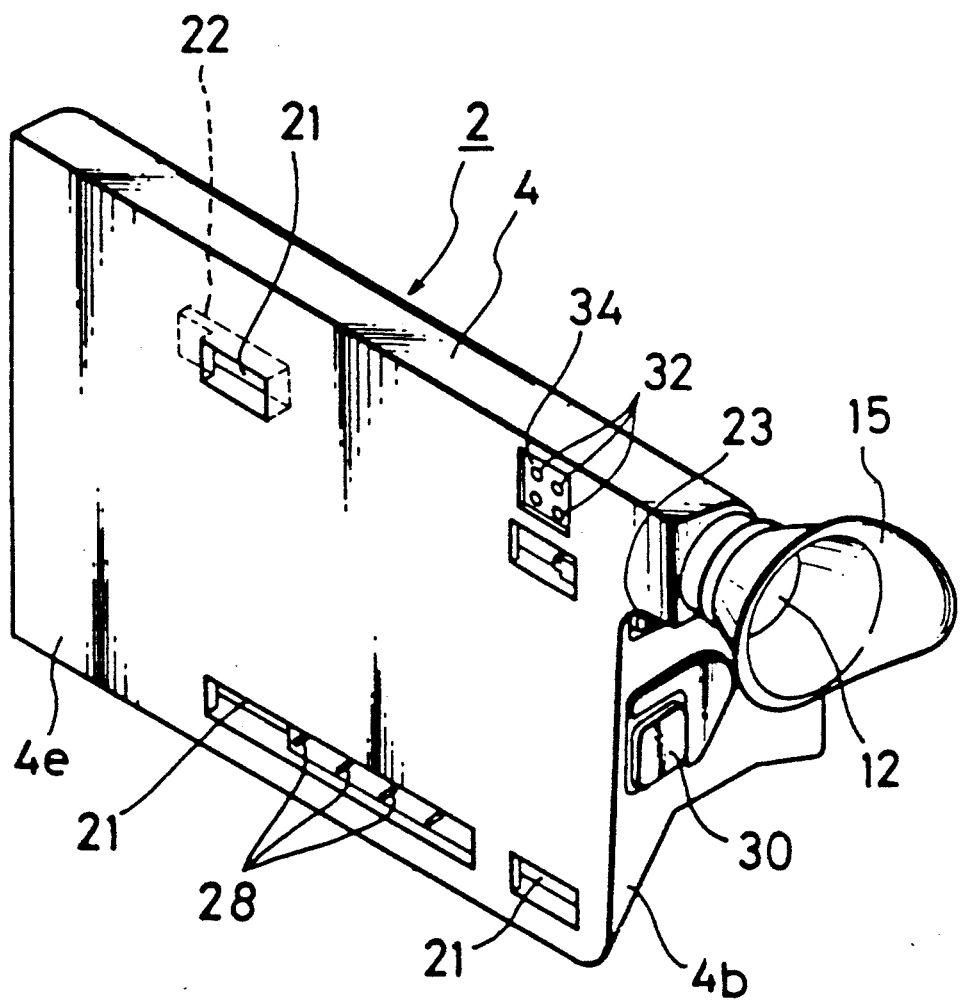
FIG. 5 is a perspective view of its hand grip section seen from its left-rear direction.

Referring to FIGS. 4 and 5, hooks 20 each being of an L-shape are provided on the right side wall 3f of the main body housing 3 at a plurality of places (four places in the illustrated example), each of the hooks 20 facing, or opening the front side of the main body housing 30. On the other hand, through the left side wall 4e of of hand grip housing 4, there are formed four recess portions 21 in opposing relation to the above-mentioned four hooks 20. Further, in association with these recess portions 21, there are respectively formed engaging recesses 22 which are extended to the front side of the hand grip housing 4 within the same.

When the respective hooks 20 of the main body housing 3 are engaged with the respective concave portions 21 of the hand grip housing 4, the right side wall 3f of the main body housing 3 and the left side wall 4e of the hand grip housing 4 are closely contacted with each other. Under this state, if the main body housing 3 is slid forward relative to the hand grip housing 4, the tip ends of the respective hooks 20 are inserted into the engaging recesses 22 formed within the respective portions 21 and the main body housing 3 and the hand grip housing 4 are coupled to each other, namely, the main body 1 and the hand grip 2 are coupled with each other.

Figure 6:
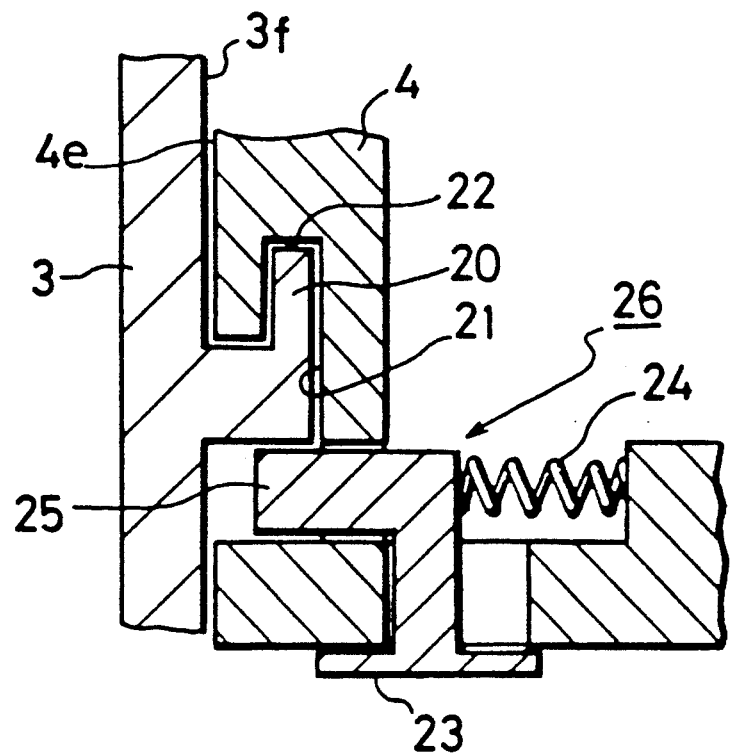
FIG. 6 is a partly sectioned view showing the state that the main body and the hand grip are coupled with each other.

In order to lock the main body 1 and the hand grip 2 in the coupled state locking means are provided. As shown in FIGS. 3 and 6, a lever 23 which is slidable in the right and left direction is attached to the rear wall 4b of the hand grip housing 4. As shown in FIG. 6, this lever 23 is slidably biased to the side of the main body housing 3 by a spring 24 and the tip end of an engaging piece member 25 connected to the lever 23 projects into the concave portion 21 to prevent removal of the hook.

During the coupling of the main body housing 3 with the hand grip housing 4, when the hooks 20 are entered into the recess portions 21, the engaging piece member 25 is moved backward against the biasing force of the spring 24. When, as shown in FIG. 6, the hooks 20 are once entered into the engaging recess portions 22, the engaging piece member 25 is positioned in the recess portion 21 and thereby its associated hook 20 is locked. It is sufficient that such locking means 26 is provided within at least one recess portion 21.

In the condition shown in FIG. 6, when the lever 23 is slid in the opposite direction to the main body housing 3 against the biasing force of the spring 24, the main body housing 3 can be moved backward relative to the hand grip housing 4, and the main body housing 3 and the hand grip housing 4 can be separated from each other.

On the connection side wall, that is, right side wall 3f of the main body housing 3, there are formed a plurality of electrical contacts 27 made of a metal plate (see FIG. 4), while on the left side wall 4e of the hand grip housing 4, there are formed a plurality of electrical contacts 28 made of conductive pins in opposing relation to the respective contacts 27 (see FIG. 5). Accordingly, when the main body housing 3 and the hand grip housing 4 are connected with each other as set forth above, the respective contacts 27 and 28 are contacted electrically so that from the rechargeable battery 16 located within the hand grip housing 4, a power current may flow to the television camera section 5 and the VTR section 6 in the main body housing 3. Further, a push switch or push button 30 for a trigger type switch is mounted on the rear wall 4b of the hand grip housing 4. The signal generated by operating this push button 30 is supplied through one of the above-mentioned contacts 27 and 28 to the main body 1. In practice, when this push button 30 is pushed initally, the video tape recorder and so on are placed in the standby mode, while when it is pushed a second time, the magnetic tape is transported and the recording is carried out.

As shown in an operational status indicating section 31 formed of a plurality of (e.g., four in the illustrated example) light emission elements are mounted on the right side wall 3f of the main body housing 3 for cooperation with a light guide 34 formed on the member 4 at the position facing the indicating section 31, upon assembly.

Specifically, in opposing relation to the respective light emission elements of the operational status indicating section 31, there are formed a plurality of (e.g. four in the illustrated example) window openings 32 and further a rectangular mask 33 is disposed at the focusing position within the optical system of the optical type view finder 12 (see (FIG. 3). Then, light guide tubes 35, each made of plastic materials or glass fibers are located between the four corners of the mask 33 and the above-mentioned window openings 32. In other words, one end of each of the light guide tubes 33 is engaged into the window openings 32 and hence the end faces thereof are directly opposed to the operational status indicating section 31 of the main body housing 3, while the other end of each of the light guide tubes 35 is engaged into the window openings which are formed through the four corners of the mask 33.

Figure 7:
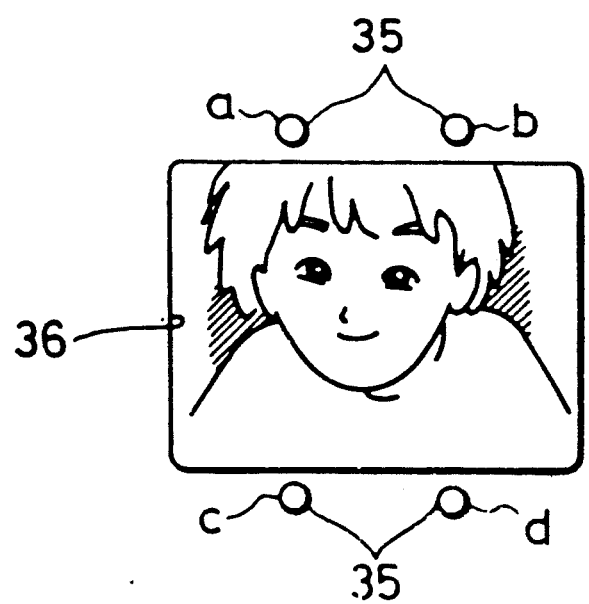
FIG. 7 is a diagram used to explain the status of an optical type view finder as seen by a user.

FIG. 7 shows an example of a picture that is viewed by the user through the optical type view finder 12. Referring to FIG. 7, the end faces of the respective light guide tubes 35 are placed outside a frame 36 of a visual field. Accordingly, when the light emission elements such as LEDs and the like constituting the optical type operational status indication section 31 are lit in response to the respective operational status of the TV camera section 5 and the VTR section 6 within the main body 1, such signal is indicated within the optical type view finder 12.

An example of the operational status indication will be described with reference to FIG. 7, in which respective operational status are designated particularly be reference numerals a to d.

The end face a of the light guide tube is lit when the color temperature is low such as when a picture is taken in the room and so on. In this case, it is sufficient that a color filter within the optical system of the TV camera section 5 in the main body 1 is changed to proper filter. A switching lever 37 shown in FIG. 2 is provided for such switching and this switching lever 37 is slidably moved up and down.

When the end face b is lit, this indicates that the video tape recorder and so on are in standby mode. That is, this end face b is lit by pushing the above-mentioned push button 30 once. When this push button 30 is pushed once more, the end face b nrvomrd unlighted and the end face c is lit to indicate that the video tape recorder and so on are set in the operation mode (in the recording mode). The end face d indicates a status in which the amount of light is insufficient. In this case, the lack of light amount can be made up for by the use of lighting equipment. Since means for making the respective light emission elements of the operational status indicating section 31 becomes lighted, to thereby indicate the above-mentioned operational status of the TV camera section 5 and the VTR section 6 within the main body 1, is well known in the prior art, the detailed explanation therefor will not be made. Alternatively, it is, of course, possible to employ light emission elements of different colors.

Figure 8:
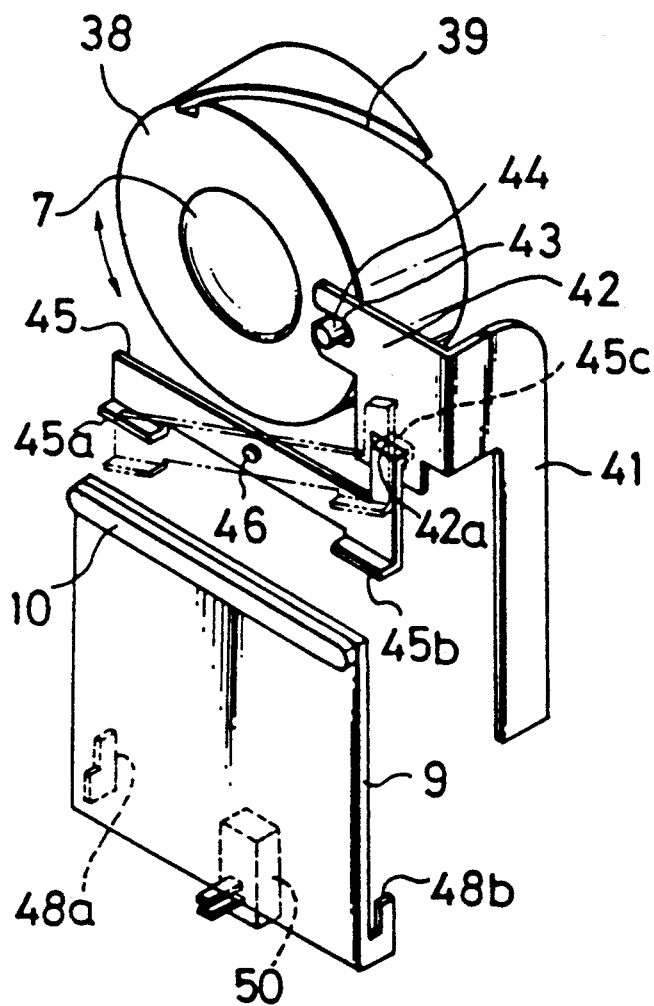
FIG. 8 is a schematic perspective view showing a relationship between a dust-proof cover and a lens of the television camera section.

The TV camera section 5 in the main body 1 may switchably take three positions, namely: wide angle lens mode, standard lens mode, and telephone lens mode, by moving the objective lens back and forth. As shown in FIG. 8, into a helical groove 39 formed on the outer peripheral surface of a cylinder 38 of the objective lens 7, there is engaged a protrusion (not shown) that extends from the inner surface of a fixed cylinder (not shown) which surrounds the cylinder 38 and which guides the same back and forth therealong. On the other hand, as shown in FIG. 2, a focus switching lever 40, which is slidable in the up and down direction, is located at the front portion of the left side wall 3e of the main body housing 3. Further, as shown in FIG. 8, a part of a connection plate 41 is attached to the rear wall of this switching lever 40 is elongated to the front of the cylinder 38 to form an elongated portion 42 and a protrusion 44 extending from the front surface of the cylinder 38 is engaged with a cut-away or recess 43 formed through this elongated portion 42, whereby when the switching lever 40 is switchably slid to the upper, neutral or lower positions, the cylinder 38 is moved back and forth and thereby the optical system of the TV camera section 5 is placed in the so-called telephoto lens mode, the standard lens mode and the wide angle lens mode, sequentially.

Further, as FIG. 8 shows, a link 45 is located under the cylinder 38 and this link 45 is pivoted through a shaft 46 to the rear wall of the window frame 47 shown in FIG. 1) that is engaged with the rear portion of the window opening 8 in the main body housing 3 so as to be moved in a seesaw-like fashion. One end of this link 45 is bent to form a bent portion 45c and this bent portion 45c is loosely engaged into a through-hole 42a that is formed through the elongated portion 42 of the connection plate 41. When the switching lever 40 is placed in the neutral (standard) position, the link 45 is placed substantially in the horizontal state as shown by the solid line in FIG. 8.

On the other hand, as shown in FIG. 8, the dust-proof cover 9 is provided at its left and right portions of the lower end with abutting portions 48a and 48b. When the dust-proof cover 9 is slid upward to shield the front portion of the objective lens 7 as shown in FIG. 2, both of these abutting portions 48a and 48b are respectively contacted with left and right lower ends 45a and 45b of the link 45 or opposed thereto with a small clearance.

Accordingly, when the switching lever 40 is slid upward from the normal (neutral) position, the objective lens 7 is placed in the wide angle lens mode and the link 45 is inclined as shown by a two-dot chain line in FIG. 8. Under this state, if the dust-proof cover 9 is closed, the abutting portion 48a is abutted against the lower end 45a of the link 45 to thereby rotate the link 45 substantially toi the horizontal position as shown by the solid line in FIG. 8. Thus, connection plate 41, or the switching lever 40 is returned to the neutral position, and hence the objective lens 7 is returned to the normal position.

Further, when the dust-proof cover 9 is opened, if the switching lever 40 is slid downward, the link 45 is inclined in the direction opposite to the above mentioned direction and the objective lens 7 is placed in the telephoto lens mode. If under this state the dust-proof cover 9 is closed, the abutting portion 48b is abutted against the lower end 45b of the link 45 and thereby this link 45 is returned substantially to the horizontal state. In other words, the switching lever 40 is returned to the neutral position. In this case, it may be possible that the lower end edge of the elongated portion 42 of the connection plate 41 is pushed upward by the abutting portion 48b.

As described above, when in the non-use mode the dust-proof cover 9 is closed, the optical system of the TV camera section 5 is placed in the standard lens mode so that in a following shooting mode, the picture will be taken in the normal mode so long as the switching lever 40 is not operated.

Within the main body housing 3, a cover opening state detection switch 50 is provided under the dust-proof cover 9. When the dust-proof cover 9 is opened, this switch 50 is switched on, by way of example.

Figure 9:
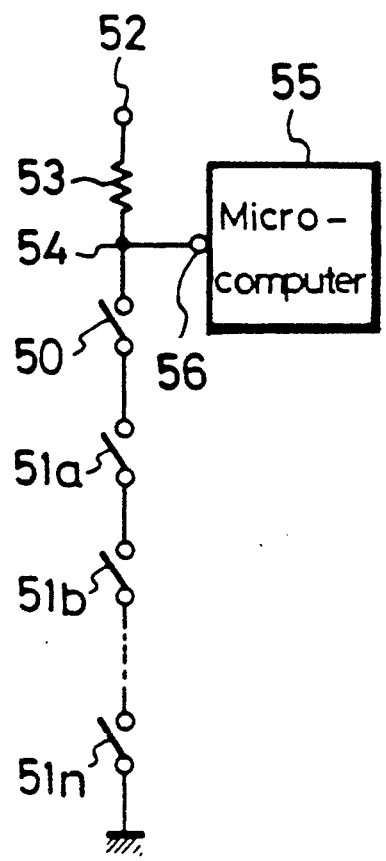
FIG. 9 is a circuit diagram showing a control circuit that controls a micro-computer used in the invention.

This switch 50 is connected in series to other switches 51a, 51b, 51c, . . . 51n, as shown in FIG. 9. These switches 51a, 51b, . . . are for example, a tape mis-erase prevention detecting switch, a switch operable by the push button 30 mentioned before, and other switches. A DC power source terminal 52 is grounded through a series circuit of a resistor 53 and the above mentioned respective switches 50, 51a, 51b. . . 51n, and a junction 54 between the series circuit of the respective switches and the resistor 53 is connected to a control terminal 56 of a micro-computer 55. This micro-computer 55 is used to control various operational statuses of the TV camera section 5 and the VTR section 6 and is not operable during a period in which the DC potential (voltage) is applied to its control terminal 56.

Accordingly, if all the switches are turned on, or all the recording conditions are satisfied, the control terminal 56 of the computer 55 is made as a ground potential so that the micro-computer 55 is placed in the operable state.

According to the present invention as described above, since in the video tape recorder having a built-in camera the main body 1 and the hand grip portion 2, which is generally located at the side wall of this main body 1, are formed to be detachable relative to each other, under this detachable state, the overall thickness of the units becomes about one-half that of the coupled state. Accordingly, if the main body 1 and the hand grip portion 2 are placed edge-to-edge on the same plane, they can be kept in a case such as the attache' case that is relatively thin. Hence, the video tape recorder having a built-in camera of the invention has an advantage that during non-use, it can be carried by the user very conveniently as a portable type.

Of course, upon use, if the main body 1 and the hand grip portion 2 are connected with each other at their connection surfaces, they can be coupled with each other mechanically. Then, when the current is supplied from the rechargeable battery 16 to the main body 1, the shooting, or the recording can be carried on.

The above description is given on a single preferred embodiment of the invention but it will be apparent that many modifications and variations could be effected by one skilled in the art without departing from the spirit or scope of the novel concepts of the invention so that the scope of the invention should be determined by that of the appended claims only.

We claim as our invention:

1. A battery connecting mechanism for connecting a battery to electric equipment and for supplying electrical power from said battery to such equipment, comprising in combination:
   a battery case containing a battery, said battery case having a first side wall;
   an equipment case containing said electric equipment, said equipment case having a second side wall adapted to abut said first side wall of said battery case;
   a first connecting member including a projection or a recess disposed on said first side wall of said battery case;
   a second connecting member including a recess or projection disposed on said second side wall of said equipment case, said projection being adapted to be received in said recess for connecting said battery case with said equipment case, said recess having a generally rectangular elongate opening and said projection being generally rectangular with one dimension substantially equal to the transverse dimension of said opening, whereby movement of said projection after insertion into said opening is restricted to one dimension;
   a first electric contacting member disposed on said first side wall of said battery case and connected to said battery; and
   a second electric contacting member disposed on said side wall of said equipment case for receiving electrical power supplied from said battery through said first electric contacting member.

2. The battery connecting mechanism according to claim 1, in which one of said first and second electric contact members comprises a pin member, and the other of said electric contact members comprises a plate member.

3. The battery connecting mechanism according to claim 1, in which one of said connecting members is an L-shaped member, one of said first and second electric contact members comprises a pin member, and the other of said contacting members comprises a plate member.

4. The battery connecting mechanism according to claim 1, wherein said electric equipment has a control signal terminal, and means for connecting said battery via said first and second electric contacting members to said control signal terminal, for controlling operation of said electric equipment.

5. The battery connecting mechanism according to claim 1, including a locking member for locking together said battery case and said equipment case.

6. The battery connecting mechanism according to claim 5, wherein said locking member comprises a locking lever and a spring member biased against said locking lever.

7. The battery connecting mechanism according to claim 6, wherein said projection is an L-shaped member.

8. A battery case for connecting a battery and adapted to be attached to an equipment case containing electric equipment which is powered by said battery, comprising in combination:
   a side wall on said battery case adapted to be juxtaposed with a side wall of said equipment case, and
   a first connecting member including a projection or a recess disposed on said side wall of said battery case adapted to cooperate with a corresponding recess or projection disposed on said side wall of said equipment case, said recess having a generally rectangular elongate opening and said projection being generally rectangular with one dimension substantially equal to the transverse dimension of said opening, whereby movement of said projection after insertion into said opening is restricted to one dimension;
   a first electric contacting member disposed on said side wall of said battery case adapted to contact a corresponding second electric contacting member disposed on said side wall of said electric equipment case, whereby electric power is supplied from said battery case through said first and second contacting members to said electric equipment.

9. The battery case according to claim 8, in which said first and second electric contacting members comprise a pin member and a plate member.

10. The battery case according to claim 8, in which said projection is an L-shaped member, and said first and second electric contacting members comprise a pin member and a plate member.

11. The battery case according to claim 8, in which said electric equipment has a control terminal for controlling operation thereof, and means for connecting said battery through said first and second electrical contacts to said control terminal.

12. The battery case according to claim 8, including a locking member for locking said battery case in assembled condition with said equipment case.

13. The battery case according to claim 12, wherein said locking member comprises a locking lever and a spring member biased against said locking lever.

14. The battery case according to claim 13, wherein said projection is an L-shaped member.

15. A video camera adapted to cooperate with a detachable battery case containing a battery comprising in combination:
   a camera case containing said video camera, said camera case having a side wall adapted to abut a corresponding side wall of said battery case,
   a connecting member comprising a recess or a projection disposed on said side wall of said camera case, and adapted to cooperate with a corresponding projection or recess disposed on said corresponding side wall of said battery case, said projection being adapted to be received in said recess for connecting said battery case to said camera case, said recess having a generally rectangular elongate opening and said projection being generally rectangular with one dimension substantially equal to the transverse dimension of said opening, whereby movement of said projection after insertion into said opening is restricted to one dimension; and
   an electric contacting member disposed on said side wall of said camera case and adapted to cooperate with a corresponding electric contacting member on said battery case, for receiving electric power supplied through said electric contacting member from said battery.

16. The video camera according to claim 15, in which said electric contact member comprises a pin member or a plate member, and is adapted to cooperate with a corresponding plate member or pin member on said battery case.

17. The video camera according to claim 15, wherein said projecting member is an L-shaped member, and said electric contacting member comprises a pin member or a plate member.

18. The video camera according to claim 15, in which said video camera has a control signal terminal for controlling operation thereof, and means for connecting said electric contacting member to said control signal terminal.

19. The video camera according to claim 15, further comprising a locking member for locking said battery case and said camera case in assembled condition.

20. The video camera according to claim 19, wherein said locking member comprises a locking lever and a spring member biased against said locking lever.

21. The video camera according to claim 20, in which said projection is an L-shaped member.

22. A video camera having attached camera and battery cases, comprising in combination:
   a camera case for containing said video camera, a battery case for containing a battery and adapted to be attached to said camera case,
   a first connecting member comprising a projection or a recess disposed on said side wall of said battery case, a second connecting member comprising a recess or projection disposed on a mating wall of said camera case, said recess and projection adapted to connect said camera case and said battery case together, said recess having a generally rectangular elongate opening and said projection being generally rectangular with one dimension substantially equal to the transverse dimension of said opening, whereby movement of said projection after insertion into said opening is restricted to one dimension,
   a first electric contacting member disposed on said side wall of said battery case, a second electric contacting member disposed on said side wall of said camera case, and cooperating with said first electric contacting member, whereby electric power is supplied from said battery through said first and second contacting member to said camera.

23. The video camera according to claim 22, wherein said electric contacting member on said battery case and said electric contact member on said equipment case comprise a pin member and a plate member.

24. The video camera according to claim 22, wherein said projection is an L-shaped member, and said first and second electric contacting member comprise a pin member and a plate member.

25. The battery case according to claim 22, wherein said electric equipment has a control terminal for controlling operation thereof, and means for connecting said battery through said first and second electrical contacting members to said control terminal.

26. The video camera according to claim 22, including a locking member for locking said battery case in assembled condition with said camera case.

27. The video camera according to claim 26, wherein said locking member comprises a locking lever and a spring member biased against said locking lever.

28. The video camera according to claim 27, wherein said projection is an L-shaped member.

29. A battery case for connecting a battery to electric equipment and adapted to be attached to an equipment case containing electric equipment which is to be powered by said battery, comprising in combination:
   a side wall on said battery case adapted to be juxtaposed with a side wall of said equipment case, and
   first connecting members including a pair of projections or a pair of recesses disposed in spaced apart relation on said side wall of said battery case and adapted to cooperate with a corresponding pair of recesses or pair of projections disposed on said side wall of said equipment case,
   each said recess having an elongate opening with at least one side wall, each of said projections having a planar side wall aligned with the side wall of its recess, whereby movement of said projections after insertion into said openings is restricted to one dimension parallel to said side walls of said recesses; and
   a first electric contacting member disposed on said side wall of said battery case adapted to contact a corresponding second electric contacting member disposed on said side wall of said electric equipment case, whereby electric power is supplied from said battery case through said first and second contacting members to said electric equipment.

30. The battery connecting mechanism according to claim 29, in which one of said first and second electric contact members comprises a pin member, and the other of said electric contact members comprises a plate member.

31. The battery connecting mechanism according to claim 29, in which one of said connecting members is an L-shaped members one of said first and second electric contact members comprises a pin member, and the other of said contact members comprises a plate member.

32. The battery connecting mechanism according to claim 29, wherein said electric equipment has a control signal terminal, and means for connecting said battery via said first and second electric contacting members to said control signal terminal, for controlling operation of said electric equipment.

33. The battery connecting mechanism according to claim 29, including a locking member for locking together said battery case and said equipment case.

34. The battery connecting mechanism according to claim 33, wherein said locking member comprises a locking lever and a spring member biased against said locking lever.

35. The battery connecting mechanism according to claim 34, wherein said projection is an L-shaped member.

36. A video camera adapted to cooperate with a detachable battery case containing a battery comprising in combination:
   a camera case containing said video camera, said camera case having a side wall adapted to abut a corresponding side wall of said battery case,
   connecting members comprising a pair of recesses or a pair of projections disposed in spaced apart relation on said side wall of said camera case, and adapted to cooperate with a corresponding pair of projections or pair of recesses disposed on said corresponding side wall of said battery case, said projections each being adapted to be received in said recesses for connecting said battery case to said camera case, said recesses each having an elongate opening with at least one side wall, each of said projections having a planar side wall aligned with the side wall of its recess, whereby movement of said projections after insertion into said opening is restricted to one dimension parallel to said side walls of said recesses; and
   an electric contact member disposed on said side wall of said camera case and adapted to cooperate with a corresponding electric contacting member on said battery case, for receiving electric power supplied through said electric contacting member from said battery.

37. The battery case according to claim 36, in which said first and second electric contacting members comprise a pin member and a plate member.

38. The battery case according to claim 36, in which said projection is an L-shaped member, and said first and second electric contacting members comprise a pin member and a plate member.

39. The battery case according to claim 36, in which said electric equipment has a control terminal for controlling operation thereof, and means for connecting said battery through said first and second electrical contacts to said control terminal.

40. The battery case according to claim 36, including a locking member for locking said battery case in assembled condition with said equipment case.

41. The battery case according to claim 40, wherein said locking member comprises a locking lever and a spring member biased against said locking lever.

42. The battery case according to claim 41, wherein said projection is an L-shaped member.

43. A video camera having attached camera and battery cases, comprising in combination:
   a camera case for containing said video camera, a battery case for containing a battery and adapted to be attached to said camera case,
   first connecting members comprising a pair of projections or a pair of recesses disposed in spaced apart relation on said side wall of said battery case, second connecting members comprising a pair of recesses or a pair of projections disposed on a mating wall of said camera case, said recesses and projections adapted to connect said camera case and said battery case together, each of said recesses having an elongate opening and at least one side wall, each of said projections having a planar side wall aligned with the side wall of its recess, whereby movement of said projection after insertion into said opening is restricted to one dimension parallel to the surface of said side walls of said recesses, and
   a first electric contacting member disposed on said side wall of said battery case, a second electric contacting member disposed on said side wall of said camera case, and cooperating with said first electric contacting member, whereby electric power is supplied from said battery through said first and second contacting member to said camera.

44. The video camera according to claim 43, in which said electric contact member comprises a pin member or a plate member, and is adapted to cooperate with a corresponding plate member or pin member on said battery case.

45. The video camera according to claim 43, wherein said projecting member is an L-shaped member, and said electric contacting member comprises a pin member or a plate member.

46. The video camera according to claim 43, in which said video camera has a control signal terminal for controlling operation thereof, and means for connecting said electric contacting member to said control signal terminal.

47. The video camera according to claim 50, further comprising a locking member for locking said battery case and said camera case in assembled condition.

48. The video camera according to claim 47, wherein said locking member comprises a locking lever and a spring member biased against said locking lever.

49. The video camera according to claim 48, in which said projection is an L-shaped member.

50. A video camera having attached camera and battery cases, comprising in combination:
a camera case for containing said video camera, a battery case for containing a battery and adapted to be attached to said camera case,
first connecting members comprising a pair of projections or a pair of recesses disposed in spaced apart relation on said side wall of said battery case, second connecting members comprising a pair of recesses or a pair of projections disposed on a mating wall of said camera case, said recesses and projections adapted to connect said camera case and said battery case together, each of said recesses having an elongate opening and at least one side wall, whereby movement of said projection after insertion into said opening is restricted to one dimension parallel to the surface of said side walls of said recesses, and
a first electric contacting member disposed on said side wall of said battery case, a second electric contacting member disposed on said side wall of said camera case, and cooperating with said first electric contacting member, 7hereby electric power is supplied from said battery through said first and second contacting member to said camera.

51. The video camera according to claim 50, wherein said electric contacting member on said battery case and said electric contact member on said equipment case comprise a pin member or a plate member.

52. The video camera according to claim 50, wherein said projection is an L-shaped member, and said first and second electric contacting members comprise a pin member or a plate member.

53. The video camera according to claim 50, wherein said electric equipment has a control terminal for controlling operation thereof, and means for connecting said battery through said first and second electrical contacting member to said control terminal.

54. The video camera according to claim 50, including a locking member for locking said battery case in assembled condition with said camber case.

55. The video camera according to claim 54, wherein said locking member comprises a locking lever and a spring member biased against said locking lever.

56. The video camera according to claim 55, wherein said projection is an L-shaped member.

* * * * *